(12) United States Patent
Hattrup et al.

(10) Patent No.: US 8,385,504 B2
(45) Date of Patent: Feb. 26, 2013

(54) DC/AC POWER INVERTER CONTROL UNIT OF A RESONANT POWER CONVERTER CIRCUIT, IN PARTICULAR A DC/DC CONVERTER FOR USE IN A HIGH-VOLTAGE GENERATOR CIRCUITRY OF A MODERN COMPUTED TOMOGRAPHY DEVICE OR X-RAY RADIOGRAPHIC SYSTEM

(75) Inventors: Christian Hattrup, Wurselen (DE); Thomas Scheel, Stolberg (DE); Peter Luerkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 261 days.

(21) Appl. No.: 12/920,321

(22) PCT Filed: Mar. 3, 2009

(86) PCT No.: PCT/IB2009/050839
§ 371 (c)(1),
(2), (4) Date: Aug. 31, 2010

(87) PCT Pub. No.: WO2009/109902
PCT Pub. Date: Sep. 11, 2009

(65) Prior Publication Data
US 2011/0002445 A1 Jan. 6, 2011

(30) Foreign Application Priority Data
Mar. 6, 2008 (EP) .................................... 08102354

(51) Int. Cl.
*H05G 1/10* (2006.01)

(52) U.S. Cl. ........................................................ 378/101
(58) Field of Classification Search .................. 378/101, 378/109, 110; 363/17, 132
See application file for complete search history.

(56) References Cited

U.S. PATENT DOCUMENTS

| 5,245,525 | A | 9/1993 | Galloway et al. |
| 5,559,684 | A | 9/1996 | Ohms et al. |
| 6,392,902 | B1 | 5/2002 | Jang et al. |
| 6,549,441 | B1 | 4/2003 | Aigner et al. |

FOREIGN PATENT DOCUMENTS

| DE | 19934749 A1 | 5/2000 |
| WO | 2006114719 A1 | 11/2006 |
| WO | 2007122530 A1 | 11/2007 |

*Primary Examiner* — Jurie Yun (57) ABSTRACT

A DC/AC power inverter control unit of a resonant-type power converter circuit (400), in particular a DC/DC converter, for supplying an output power for use in a high-voltage generator circuitry of an X-ray radiographic imaging system, a 3D rotational angiography device, or X-ray computed tomography device, comprises an interphase transformer (406) connected in series to at least one series resonant tank circuit (403$a$ and 403$a'$ or 403$b$ and 403$b'$) at the output of two DC/AC power inverter stages (402$a$+$b$) supplying a multi-primary winding high-voltage transformer (404). The interphase transformer (406) removes a difference ($\Delta I$) in resonant output currents and ($I_1$ and $I_2$) of the DC/AC power inverter stages (402$a$+$b$). In addition, a control method is disclosed which assures that the interphase transformer (406) is not saturated. Furthermore, the control method ensures zero current operation and provides for minimized input power losses.

17 Claims, 9 Drawing Sheets

-- PRIOR ART --

FIG. 3

-- PRIOR ART --

-- PRIOR ART --

| State combination # | U₁ state (Inverter 1) | U₂ state (Inverter 2) | (U₁ + U₂)/2 state (Average) | Annotation |
|---|---|---|---|---|
| 1 | + | + | +1 | |
| 2 | + | 0 | +1/2 | |
| 3 | 0 | 0 | 0 | |
| 4 | - | 0 | -1/2 | |
| 5 | - | - | -1 | |
| 6 | + | + | +1 | |
| 7 | 0 | + | +1/2 | |
| 8 | - | + | 0 | Undesired |
| 9 | 0 | - | -1/2 | |
| 10 | + | - | 0 | Undesired |

FIG. 6

| $(\underline{U}_1 + \underline{U}_2)/2$ state (Average) | inverter current $\underline{I}_1, \underline{I}_2$ | inverter current difference $\Delta \underline{I}$ | inverter 1 command | inverter 2 command |
|---|---|---|---|---|
| +1 | don't care | don't care | + | + |
| +1/2 | negative | positive | + | 0 |
| +1/2 | negative | negative | 0 | + |
| 0 | positive | positive | 0 | + |
| 0 | positive | negative | + | 0 |
| 0 | don't care | don't care | 0 | 0 |
| -1/2 | negative | positive | 0 | - |
| -1/2 | negative | negative | - | 0 |
| -1/2 | positive | positive | - | 0 |
| -1/2 | positive | negative | 0 | - |
| -1 | don't care | don't care | - | - |

DC/AC POWER INVERTER CONTROL UNIT OF A RESONANT POWER CONVERTER CIRCUIT, IN PARTICULAR A DC/DC CONVERTER FOR USE IN A HIGH-VOLTAGE GENERATOR CIRCUITRY OF A MODERN COMPUTED TOMOGRAPHY DEVICE OR X-RAY RADIOGRAPHIC SYSTEM

The present invention refers to a DC/AC power inverter control unit of a resonant-type power converter circuit, in particular a DC/DC converter, for supplying an output power for use in, for example, a high-voltage generator circuitry of an X-ray radiographic imaging system, 3D rotational angiography device or X-ray computed tomography device of the fan- or cone-beam type. More particularly, the present invention is directed to a resonant-type power converter circuit which comprises an interphase transformer connected in series to at least one series resonant tank circuit at the output of two DC/AC power inverter stages supplying a multi-primary winding high-voltage transformer, wherein said interphase transformer serves for removing the difference in the resonant output currents of the DC/AC power inverter stages. Furthermore, the present invention is dedicated to a control method which assures that the interphase transformer is not saturated. This control method ensures zero current operation and provides for that input power losses can be minimized.

BACKGROUND OF THE INVENTION

High-voltage generators for X-ray tube power supplies as used in medical X-ray imaging typically comprise at least one multi-phase high-voltage transformer which provides the required power for operating the X-ray tube to the tube's cathode and anode. In conventional high-voltage generators circuits, an AC voltage adjusting device, such as e.g. an autotransformer, supplies line power to the multi-phase primary of a high-voltage transformer. A switching device, such as e.g. a silicon-controlled rectifier (SCR) in conjunction with a bridge rectifier, opens and closes the star point of the multi-phase primary to turn on and off high voltage at the X-ray tube. Inductive and capacitive effects in the transformer and associated power supply components generally cause the high voltage to rise above its steady-state level during a period immediately following completion of the circuit. The severity of this overshoot is known to increase with increasing X-ray tube voltage and to decrease with increasing X-ray tube current. Especially phase-shifted pulse width modulation (PWM) inverter-fed DC/DC power converters with a high-voltage transformer parasitic resonant link as used for an X-ray power generator thereby exhibit stiff nonlinear characteristics due to phase-shifted voltage regulation and diode cutoff operation in a high-voltage rectifier because of the wide load setting ranges in practical applications.

Modern resonant DC/DC converters, such as those used within high-voltage generator circuitries for providing X-ray tubes with high supply voltages, are operated at high switching frequencies. It is evident that any switching losses incurred by the associated power switches in a single switching cycle have to be reduced in order to limit the overall power losses.

An established method of doing this is zero current switching (ZCS), where turning the power switches on and off is only permitted at or near the zero crossings of the resonant current. This method is common practice in soft switching converters but has the drawback that it inhibits the controllability of the output power. Zero current switching and good controllability are effectively conflicting requirements, as good controllability is normally achieved by a continuous on-time control of the power switches, in which case ZCS can not be guaranteed for all points of operation. Therefore, switching losses emerge, such that there tends to be a trade-off between switching losses and controllability of the output power.

Recently, a variety of switched-mode high-voltage DC power supplies using voltage-fed-type or current-fed-type high-frequency transformer resonant inverters with MOS gate bipolar power transistors (IGBTs) have been developed for medical-use X-ray high power generators. In general, high-voltage high-power X-ray generators using voltage-fed high-frequency inverters in conjunction with a high-voltage transformer link have to meet the following requirements: (i) short rising period in start transient of X-ray tube voltage, (ii) no overshoot transient response in tube voltage, and (iii) minimized voltage ripple in periodic steady-state under extremely wide load variations and filament heater current fluctuation conditions of the X-ray tube.

SUMMARY OF THE INVENTION

High-voltage generator circuitries for use in CT or X-ray devices preferably consist of a series resonant circuit for driving a high-voltage transformer. Conventional DC/DC power controllers as used in the scope of such a high-voltage generator circuitry, such as e.g. described in WO 2006/114719 A1, thereby demand the modulator to switch the DC/AC power inverter stages different from each other, which hence results in different resonant currents in the DC/AC power inverter stages operating together on one multi-winding transformer. As a consequence, zero current switching is no longer ensured for all operation points, which leads to an introduction of unwanted losses. Conventionally, a special control method is applied to assure zero current switching at any time while maintaining the controllability of the high output voltage. If the DC/AC power inverter stages are operated together, the control method may result in asymmetric current distribution. As a consequence, however, zero current switching is no longer ensured for all operation points, which causes unwanted losses.

Therefore, it is an object of the present invention to provide for an effective control of the supplied output power while ensuring zero current operation in each switching cycle such that unwanted losses can be avoided.

To address this object, a first exemplary embodiment of the present invention is dedicated to a DC/AC power inverter control unit of a resonant power converter circuit. Said power converter circuit thereby comprises two independent DC/AC power inverter stages for supplying a multi-primary winding transformer with said DC/AC power inverter stages being inductively coupled by a first and a second winding of an interphase transformer which is designed to balance differences in the output currents of the two DC/AC power inverter stages. In this connection, it should be noted that said resonant power converter circuit may be realized as a DC/DC converter for use in a high-voltage generator circuitry and that said multi-primary winding transformer may be designed for high-voltage operation. Said high-voltage generator circuitry may serve for supplying an output power for an X-ray radiographic imaging system, 3D rotational angiography device or X-ray computed tomography device of the fan- or cone-beam type.

According to the present invention, said DC/AC power inverter control unit may be adapted to minimize the magnitude of the inverter output currents' difference value to a value which ensures that the interphase transformer is not operated in a saturated state by controlling the switching states and/or switching times of the DC/AC power inverter stages dependent on this current difference, thus enabling zero current operation.

In this context, it should be noted that the first winding of the interphase transformer may preferably be connected in series to at least one resonant tank circuit serially connected to a first primary winding of the multi-winding transformer at the output port of a first one of said DC/AC power inverter stages, and the second winding of the interphase transformer may preferably be connected in series to at least one further resonant tank circuit serially connected to a second primary winding of the multi-winding transformer.

Furthermore, a second exemplary embodiment of the present invention refers to a resonant power converter circuit. As described above with reference to said first embodiment, said power converter circuit comprises two independent DC/AC power inverter stages for supplying a multi-primary winding transformer with said DC/AC power inverter stages being inductively coupled by a first and a second winding of an interphase transformer which is designed to balance differences in the output currents of the two DC/AC power inverter stages. Again, it should be noted that said resonant power converter circuit may be realized as a DC/DC converter for use in a high-voltage generator circuitry and that said multi-primary winding transformer may be designed for high-voltage operation. Said high-voltage generator circuitry may serve for supplying an output power for an X-ray radiographic imaging system, 3D rotational angiography device or X-ray computed tomography device of the fan- or cone-beam type.

According to the present invention, said resonant power converter circuit may comprise a DC/AC power inverter control unit which may be adapted to minimize the magnitude of the inverter output currents' difference to a value which ensures that the interphase transformer is not operated in a saturated state by controlling the switching states and/or switching times of the DC/AC power inverter stages dependent on this current difference, thus enabling zero current operation.

As described above, the first winding of the interphase transformer may preferably be connected in series to at least one resonant tank circuit serially connected to a first primary winding of the multi-winding transformer at the output port of a first one of said DC/AC power inverter stages, and the second winding of the interphase transformer may preferably be connected in series to at least one further resonant tank circuit serially connected to a second primary winding of the multi-winding transformer.

A third exemplary embodiment of the present invention is directed to an X-ray radiographic imaging system, 3D rotational angiography device or X-ray computed tomography device of the fan- or cone-beam type comprising a resonant power converter circuit for supplying an output power for use in a high-voltage generator circuitry which provides said computed tomography device or X-ray radiographic system with a supply voltage for operating an X-ray tube. Thereby, said power converter circuit comprises two independent DC/AC power inverter stages for supplying a multi-primary winding transformer with said DC/AC power inverter stages being inductively coupled by a first and a second winding of an interphase transformer which is designed to balance differences in the output currents of the two DC/AC power inverter stages.

According to the present invention, said X-ray radiographic imaging system, 3D rotational angiography device or X-ray computed tomography device may comprise a DC/AC power inverter control unit which may be adapted to minimize the magnitude of the inverter output currents' difference to a value which ensures that the interphase transformer is not operated in a saturated state by controlling the switching states and/or switching times of the DC/AC power inverter stages dependent on this current difference, thus enabling zero current operation.

As already described above, the first winding of the interphase transformer may preferably be connected in series to at least one resonant tank circuit serially connected to a first primary winding of the multi-winding transformer at the output port of a first one of said DC/AC power inverter stages, and the second winding of the interphase transformer may preferably be connected in series to at least one further resonant tank circuit serially connected to a second primary winding of the multi-winding transformer.

A fourth exemplary embodiment of the present invention is related to a method for controlling a resonant power converter circuit for supplying an output power for use in a high-voltage generator circuitry of an X-ray radiographic imaging system, 3D rotational angiography device or X-ray computed tomography device of the fan- or cone-beam type. As described above with reference to said second embodiment, the aforementioned resonant power converter circuit thereby comprises two independent DC/AC power inverter stages for supplying a multi-primary winding transformer, wherein these DC/AC power inverter stages may be inductively coupled by a first and a second winding of an interphase transformer for balancing differences in the resonant output currents of the two DC/AC power inverter stages. Thereby, said first winding may be connected in series to a first primary winding of the multi-winding transformer at the output port of a first one of said DC/AC power inverter stages, and said second winding may be connected in series to a second primary winding of the multi-winding transformer. According to the main idea of the present invention, said method may comprise the steps of continuously detecting the two inverters' resonant output currents during an initiated X-ray imaging session while symmetrizing the current flows at the output ports of the two DC/AC power inverter stages by using said interphase transformer, calculating the magnitude of a current difference which is obtained by subtracting the resonant current at the output port of a second one of the two DC/AC power inverter stages from the resonant current at the output port of a first one of these two DC/AC power inverter stages and controlling the switching states and/or switching times of the two DC/AC power inverter stages dependent on the calculated difference of the detected inverter output currents such that said current difference takes on a minimum value which ensures that the interphase transformer is not operated in a saturated state, thus enabling zero current operation.

A fifth exemplary embodiment of the present invention finally pertains to a computer program product for implementing a method of controlling a resonant power converter circuit supplying an output power for use in a high-voltage generator circuitry of an X-ray radiographic imaging system, 3D rotational angiography device or X-ray computed tomography device of the fan- or cone-beam type when running on an operational control unit of such a system or device. As described above with reference to said second embodiment, said resonant power converter circuit may thereby comprise two independent DC/AC power inverter stages for supplying a multi-primary winding transformer and said DC/AC power inverter stages being inductively coupled by a first and a second winding of an interphase transformer for balancing differences in the resonant output currents of the two DC/AC power inverter stages, wherein said first winding may be connected in series to a first primary winding of the multi-winding transformer at the output port of a first one of said DC/AC power inverter stages and wherein said second winding may be connected in series to a second primary winding of the multi-winding transformer. According to the present invention, said computer program product may thereby be foreseen for executing the steps of calculating the magnitude of a current difference which is obtained by subtracting the resonant current detected at the output port of a second one of the two DC/AC power inverter stages from the resonant current detected at the output port of a first one of these two DC/AC power inverter stages, said currents being symmetrized by means of said interphase transformer, and controlling the switching states and/or switching times of the two DC/AC power inverter stages dependent on the calculated difference of the detected inverter output currents such that said current difference takes on a minimum value which ensures that the interphase transformer is not operated in a saturated state, thus enabling zero current operation.

BRIEF DESCRIPTION OF THE DRAWINGS

These and other advantageous features and aspects of the invention will be elucidated by way of example with respect to the embodiments described hereinafter and with respect to the accompanying drawings. Therein.

DETAILED DESCRIPTION OF THE PRESENT INVENTION

In the following sections, an exemplary embodiment of the claimed DC/DC power converter circuit as well as an exemplary embodiment of the claimed control method according to the present invention will be explained in more detail, thereby referring to the accompanying drawings.

Figure 1:
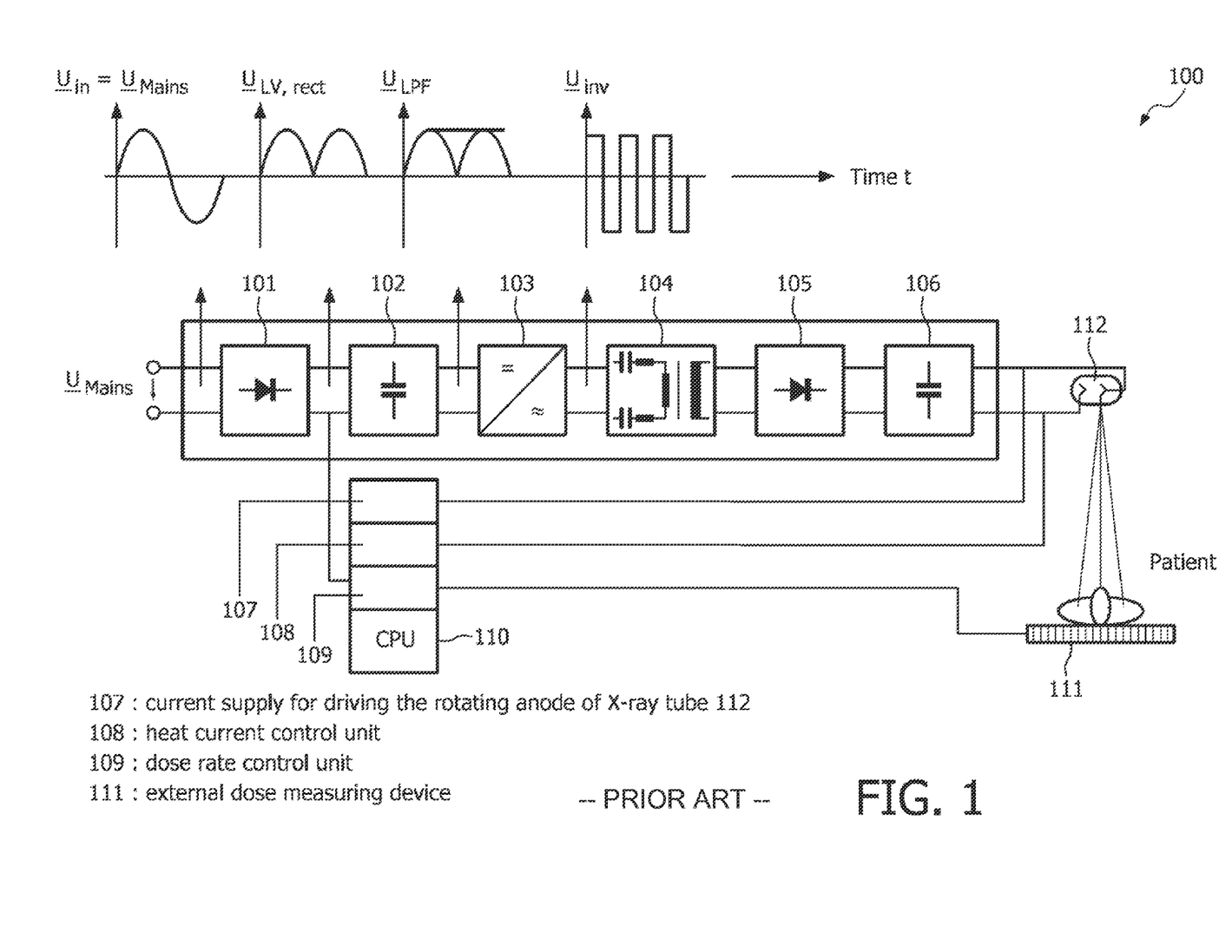
FIG. 1 shows a block diagram for illustrating the principle components of multi-pulse high-voltage generators as commonly used according to the prior art for providing the supply voltage of an X-ray tube.

FIG. 1 illustrates the principle of high-frequency inverter technology, which is also known as direct voltage conversion. It thereby shows the principle components of a conventional multi-pulse high-voltage generator used for providing the supply voltage of an X-ray tube 112. First, an intermediate DC voltage $U_{LPF}$ with more or less ripple is generated by rectifying and low-pass filtering an AC voltage $U_{Mains}$ which is supplied by the mains, thereby using an AC/DC converter stage 101 followed by a first low-pass filtering stage 102, wherein the latter may simply be realized by a single smoothing capacitor. Although the electric output power will naturally differ, the same high-voltage quality can be obtained from a single-phase power source as from a three-phase power source. A DC/AC power inverter stage 103 post-connected to said low-pass filtering stage 102 then uses the intermediate DC voltage to generate a high-frequency alternating voltage $U_{inv}$ feeding a dedicated high-voltage transformer 104 which is connected on its secondary side to a high-voltage rectifier 105 and a subsequent second low-pass filtering stage 106, wherein the latter may also be realized by a single smoothing capacitor. The obtained output voltage $U_{out}$ may then be used as a high-frequency multi-pulse tube voltage for generating X-radiation in the X-ray tube 112.

In this context, it should be noted that high-frequency inverters normally apply pulse-width modulation or act as a resonant circuit type depending on the power switches used. On the assumption that the depicted multi-pulse high-voltage generator circuitry allows for a reduction in the transformer core cross section, transformation of high-frequency AC voltages yields a very small high-voltage transformer volume. With such a circuitry, X-ray tube voltage and current can be controlled independently and are largely unaffected by power source voltage fluctuations. Electronic X-ray tube voltage control units thereby typically exhibit a response time of 0.1 ms or less.

Figure 2:
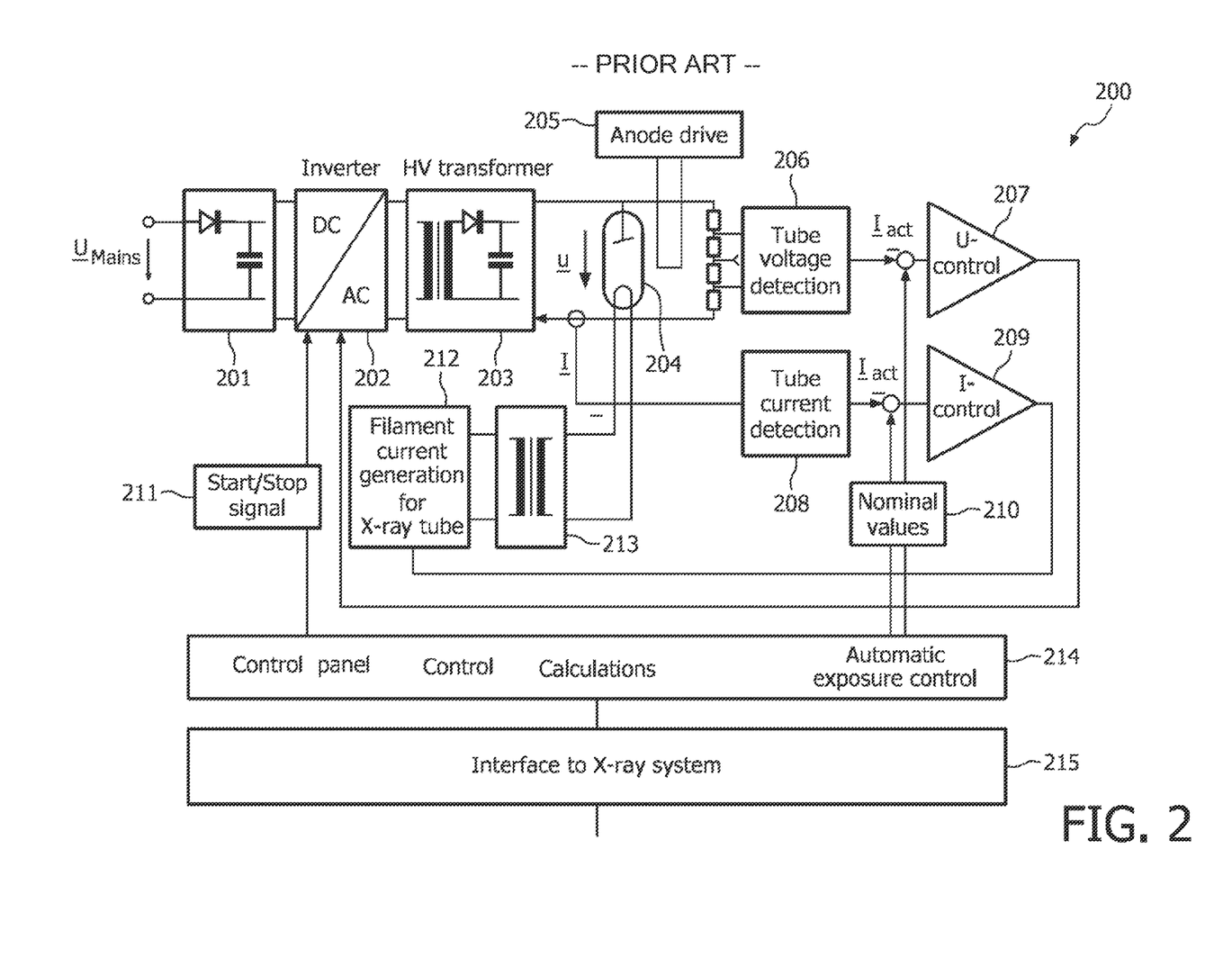
FIG. 2 shows a closed-loop control circuit for illustrating the principle of X-ray tube voltage and tube current control as known from the prior art.

A closed-loop control circuit for illustrating the principle of X-ray tube voltage and tube current control as known from the prior art is shown in FIG. 2. Typically, an actual value $U_{act}$ of X-ray tube voltage is measured and compared to a nominal value $U_{nom}$ selected by the operator at the control console in a comparator circuit. Depending on this information, the power switches are adjusted in a predefined manner (such as e.g. described in WO 2006/114719 A1). The speed of this control depends mainly on the inverter frequency. Although it is not quite as fast as constant potential high-voltage generators, the inverter easily exceeds the speed of conventional multi-peak rectifiers. The ripple in the resulting voltage on the secondary side of the transformer is influenced mainly by the inverter frequency, the internal smoothing capacity, the capacity of the high-voltage supply cables and the level of the intermediate DC voltage $U_{LPF}$.

Figure 3:
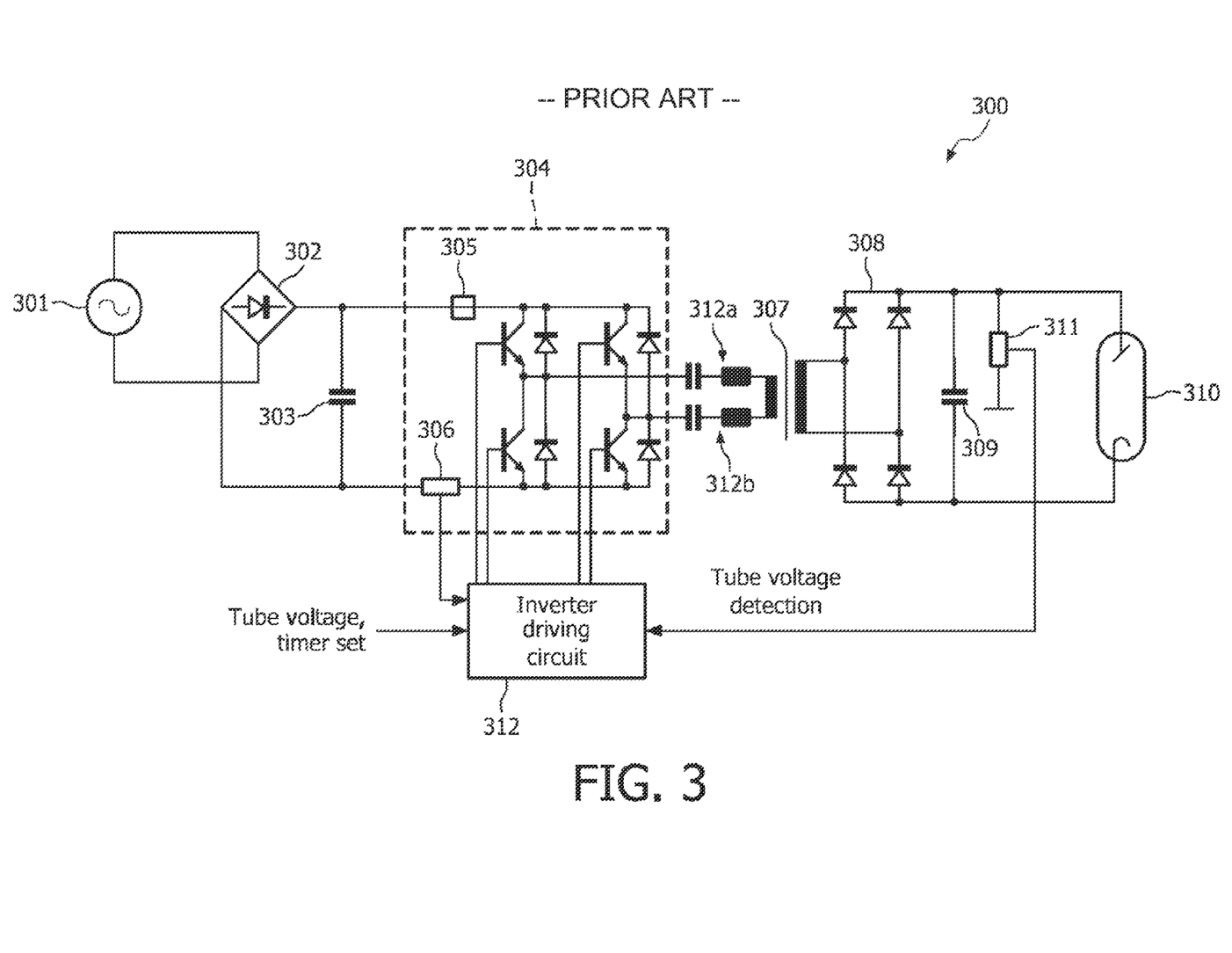
FIG. 3 shows an analog implementation of an inverter-type high-voltage generator according to the prior art as described with reference to FIG. 1 which may be used in a medical X-ray system.

An analog implementation of an inverter-type high-voltage generator according to the prior art as described with reference to FIG. 1, which may e.g. be used in a medical X-ray system, is shown in FIG. 3. As shown in FIG. 3, an AC voltage supplied from the mains is rectified and smoothed by a full-wave rectifier 302 and a smoothing capacitor 303 into an intermediate DC voltage and then supplied to a DC/AC full-bridge power inverter stage 304 consisting of four bipolar high-power switching transistors. Furthermore, a fuse 305 is connected to one end of the input side of the inverter circuit 304, and a current detector 306 is connected to the other end of the inverter circuit 304.

First, a DC input voltage is converted into a high-frequency AC voltage (e.g., 200 kHz) by means of inverter circuit 304. After that, said AC voltage is transformed into an AC voltage of a higher level (e.g., 150 kV) by means of a high-voltage transformer 307 which is then rectified and smoothed by a high-voltage rectifier 308 and a smoothing capacitor 309. Said high-voltage rectifier 308 may be given by a silicon rectifier with a breakdown voltage of about 150 kV, etc. Finally, the obtained DC high voltage is applied to an X-ray tube 310. A voltage dividing resistor 311 is connected in parallel with the capacitor 309. As a detection value of a tube voltage (i.e., a detection value corresponding to the applied voltage to the X-ray tube), a voltage across the voltage dividing resistor 311 is fed back to an inverter driving circuit 312 which is used for controlling the switching timing of the inverter circuit 304.

To the inverter driving circuit 312, a detection value of the inverter current detector 306, the detection value of the tube voltage, a set value for setting the tube voltage as well as a set value (exposure time) for setting a timer are fed. These values are respectively input via a console (not shown) of the X-ray system. As depicted in FIG. 3, the inverter driving circuit 312 generates an output signal which drives the switching transistors of the inverter circuit 304.

Figure 4:
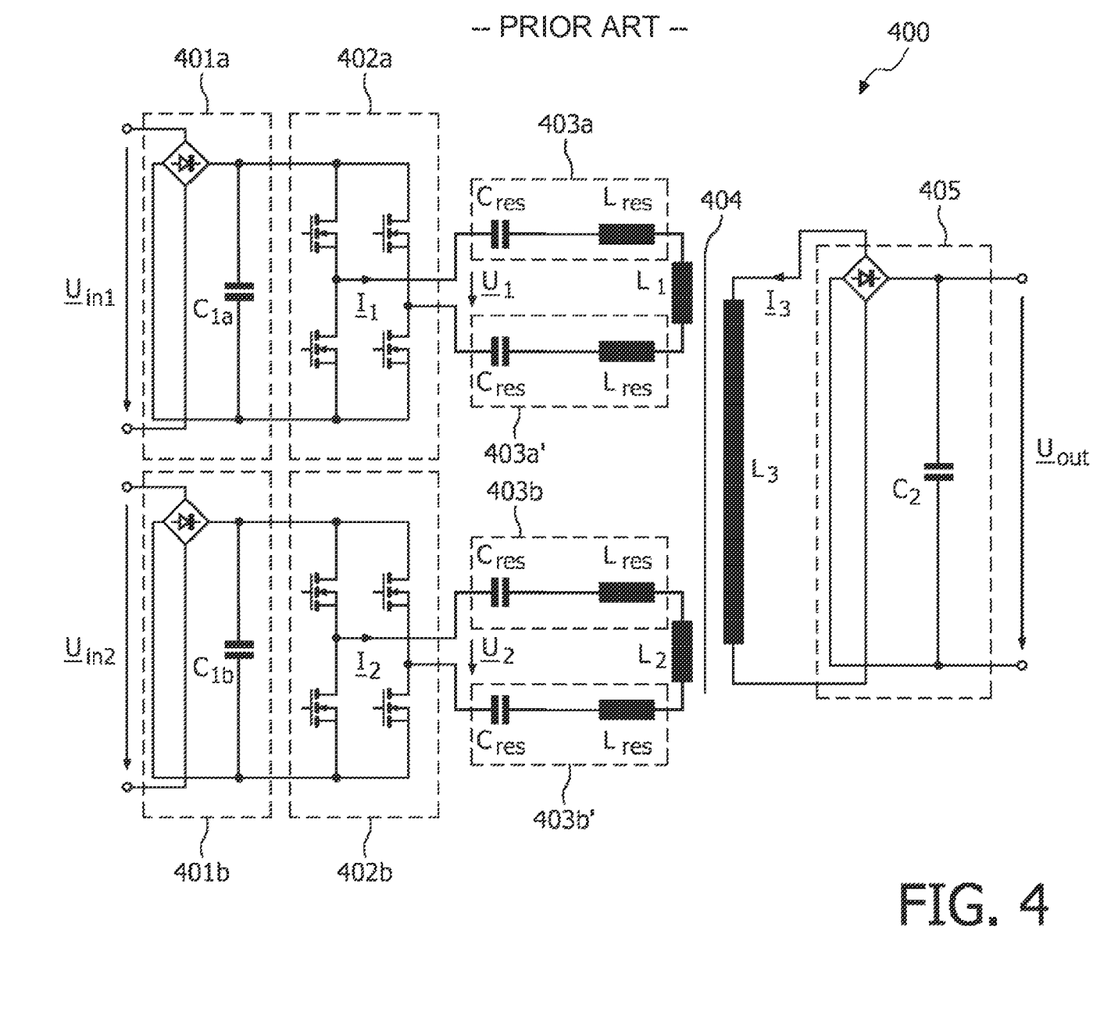
FIG. 4 shows an analog circuitry of a resonant DC/DC power converter circuit for supplying an output power for use in a high-voltage generator circuitry with two independent DC/AC power inverter stages as known from WO 2006/114719 A1.

CT or X-ray high-voltage generators preferably consist of DC/AC full-bridge power inverter stages which are connected to a series resonant circuit for driving the high-voltage transformer (cf. FIG. 4). In this figure, an analog circuitry of a resonant DC/DC power converter circuit for supplying an output power for use in a high-voltage generator circuitry with two independent DC/AC power inverter stages as known from WO 2006/114719 A1 is shown. Therein, it is depicted how two inverter circuits 402a+b can work on one high-voltage transformer 404 with multiple windings. It can be shown that the size of discrete steps of the DC/DC power converter output voltage $U_{out}$ can be reduced, resulting in an even lower output voltage ripple. Due to the coupling of the two resonant circuits by the common transformer, a voltage divider function is realized. Instead of switching between three operation modes as described above in relation to a first exemplary embodiment of the present invention, five relevant modes are achievable here. The five voltage levels created by these modes are categorized +1, +½, 0, −½, −1, and result as a combination of the "+", "−" and "0" modes of the two independent inverters 402a+b.

To reduce losses, the DC/AC power inverter stages are preferably switched at zero current. WO 2006/114719 A1 thereby describes a control method that realizes zero current switching under all circumstances in combination with an innovative controller to simultaneously control the high output voltage.

Figure 5:
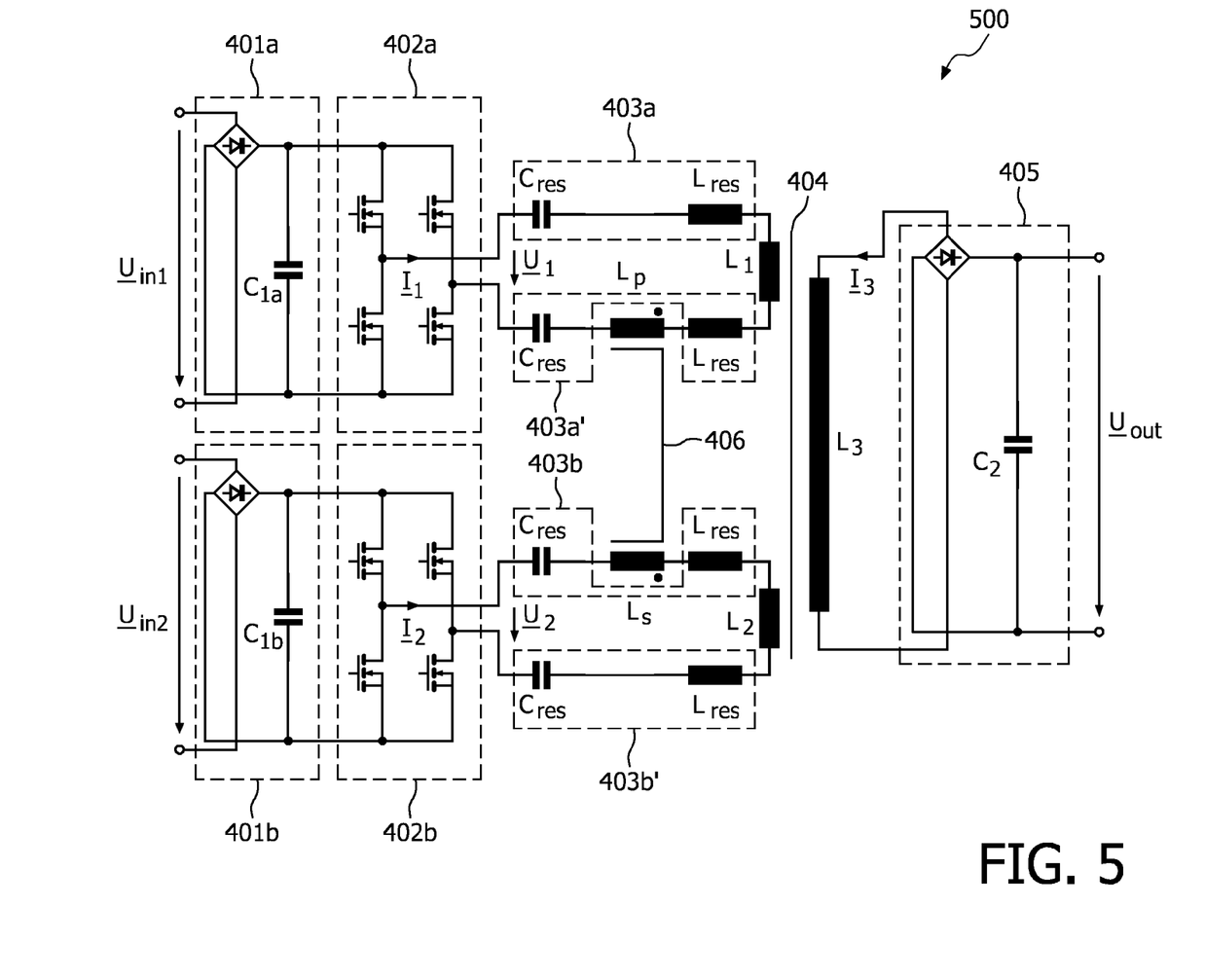
FIG. 5 shows an analog circuitry of a resonant DC/DC power converter circuit for supplying an output power for use in a high-voltage generator circuitry of an X-ray radiographic imaging system, 3D rotational angiography device or X-ray computed tomography device of the fan- or cone-beam type, wherein said DC/DC power converter circuitry comprises two independent DC/AC power inverter stages for supplying a multi-primary winding high-voltage transformer and wherein said DC/AC power inverter stages are inductively connected by an interphase transformer.

FIG. 5 shows a schematic diagram of the two independently controlled DC/AC power inverter stages whose outputs are serially connected to a series resonant circuit and either the first or the second winding of the interphase transformer, wherein the latter ensures a current symmetrization between the two independently operating DC/AC power inverter stages.

Therein, interphase transformer 406 ensures a symmetrization of the inverter's AC output currents as long as no saturation effects take place. Basically, inter-phase transformer 406 works as an inductive voltage divider. Because it does not have an air gap, difference in the inverter output currents is very small as long as said inter-phase transformer is not saturated. This current corresponds to the magnetizing current of a common transformer. Saturation can be produced if the integral over time of the voltage differences of the two DC/AC power inverter stages exceeds a limit, defined by the maximum flux linkage of the interphase transformer. When this happens, current difference between the two DC/AC power inverter stages will increase.

To keep interphase transformer 406 as small as possible, a control algorithm is introduced to minimize the current difference of inverter currents, which has the effect that the integral of voltage difference of the two DC/AC power inverter stages' output voltages over the time is minimized. Thereby, all the advantages of the controller structure described in WO 2006/114719 A1 can be maintained. In WO 2006/114719 A1, three different operating modes are described, denoted by a plus sign (for increasing the amplitude of the resonant current, e.g. having the inverter voltage in phase with the resonant current), a zero sign (e.g. applying zero voltage, having a maintaining effect on the amplitude of the resonant current), and a minus sign (for reducing the amplitude of the resonant current, e.g. having the inverter voltage opposite to the current).

Figure 6:
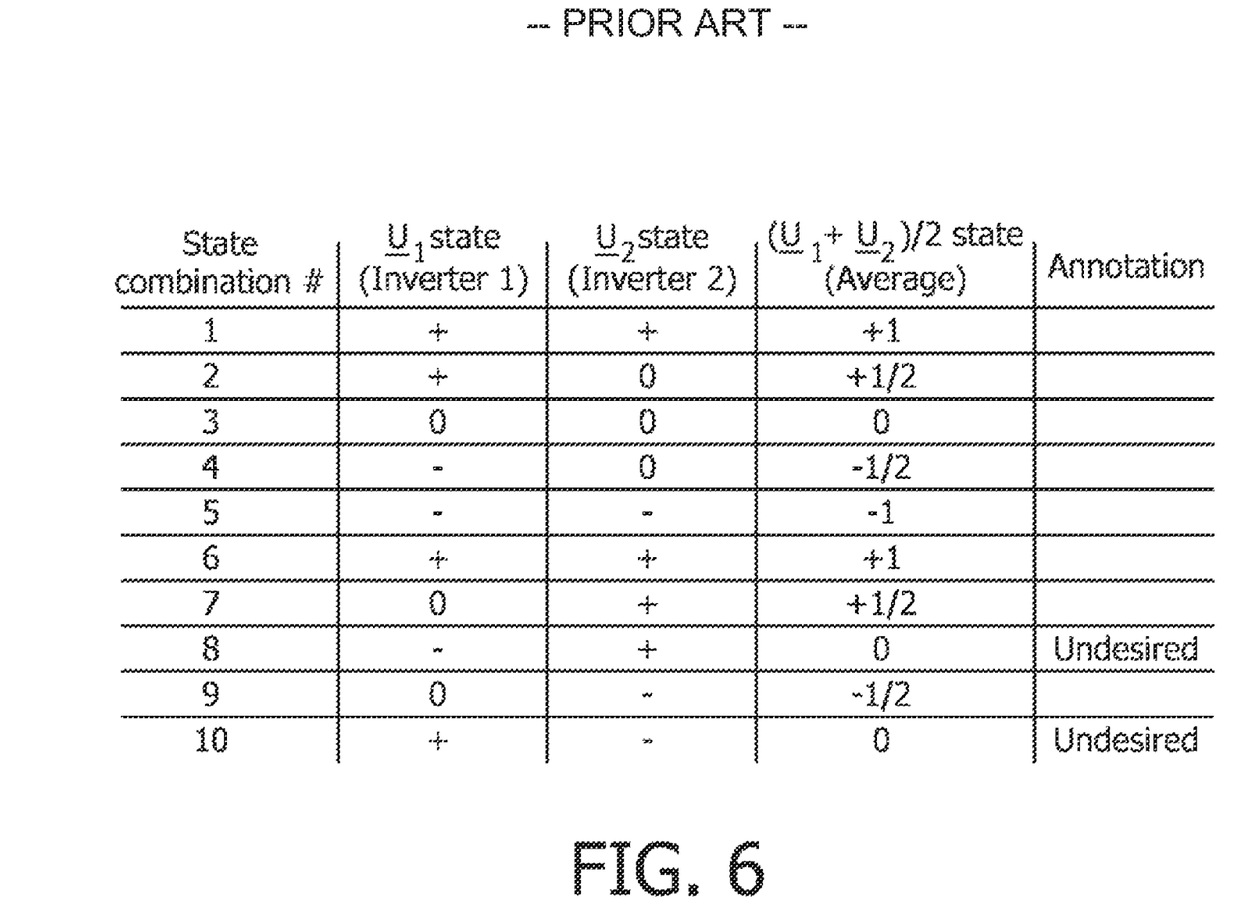
FIG. 6 shows a truth table for possible combinations of operation modes for two DC/AC power inverter stages working on a single high-voltage transformer as known from WO 2006/114719 A1.

FIG. 4, which corresponds to FIG. 11 as contained and described in reference document WO 2006/114719 A1, shows a schematic diagram on how two inverter circuits can work on one transformer having multiple windings. This allows two additional switching modes resulting from the combination of a plus state or minus state in one inverter with a zero state in the other inverter. The resulting five levels are categorized as +1, +½, 0, −½ and −1. All possible combinations of operation modes having two DC/AC power inverter stages working on one high-voltage transformer are depicted in the table as depicted in FIG. 6, which corresponds to FIG. 12 from reference document WO 2006/114719 A1.

Obviously, there are some combinations which result in the same effective output voltage, but are constituted differently. There are the redundant combinations 2 and 7 leading to the +½ level and the redundant combinations 4 and 9 leading to the −½ level, which results in a degree of freedom for the choice of potential switching patterns. The subsequently described control algorithm uses this degree of freedom to provide already some inverter current balancing and thus reduces the risk of saturation of the interphase transformer. There are also the combinations 8 and 10, which are usually undesired because they produce the output voltage zero with an extra of switching losses in the converter. While these are not considered here furthermore, they may also serve as balancing states for the interphase transformers.

Figure 7:
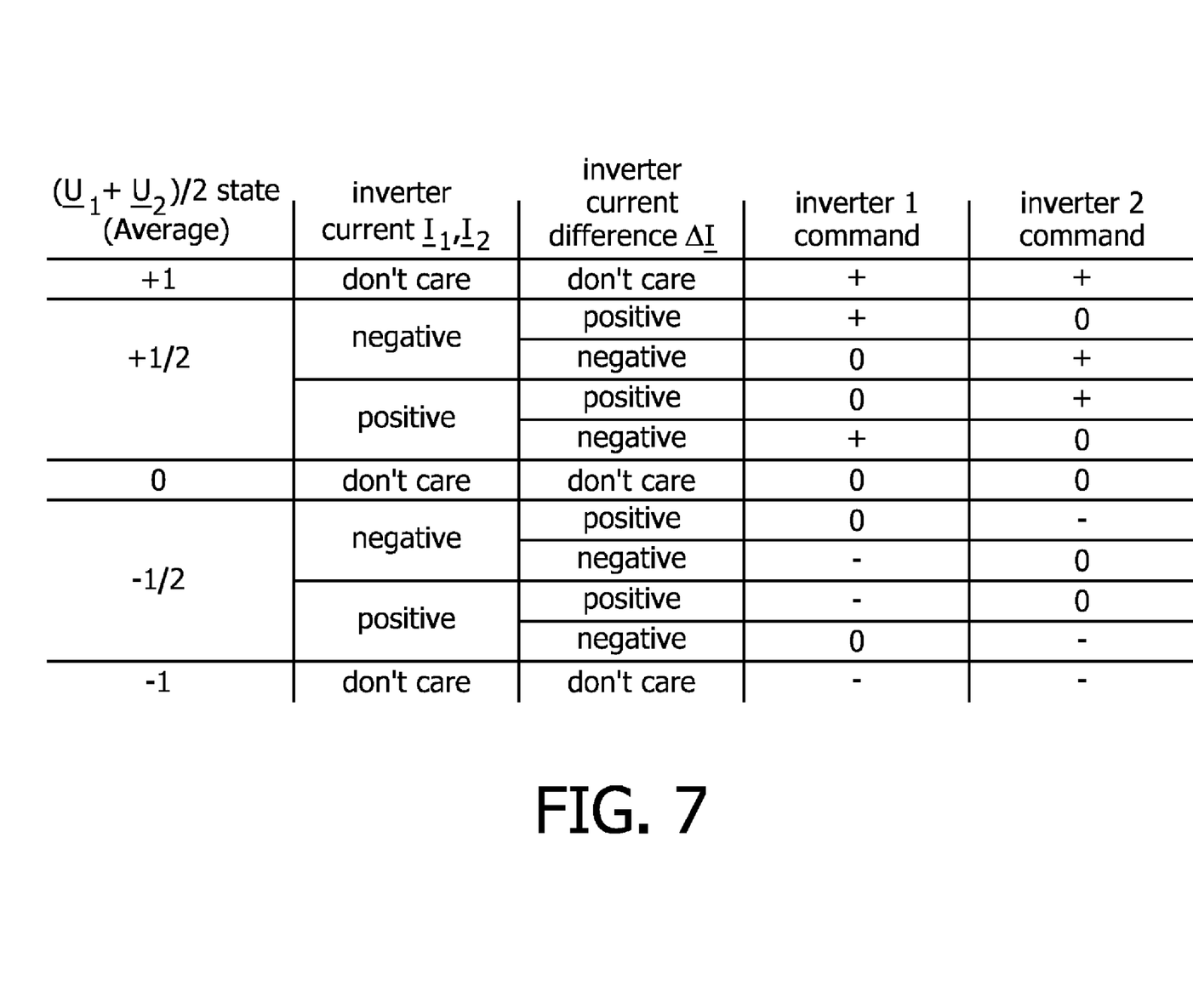
FIG. 7 shows a truth table for a control algorithm which may be executed for minimizing an observable difference in the two resonant inverter output currents as proposed in the control method according to the present invention.

One method to symmetrize the inverter currents is to compare their difference, for example by subtracting second inverter's output current ($I_2$) from the output current of said first inverter ($I_1$) with a simple operational amplifier circuit and comparing it to zero or by directly comparing both signals. The resulting digital signal indicates which of the currents is larger. FIG. 7 shows a truth table which illustrates the proposed control algorithm for minimizing the current difference.

From this table it can be taken that the controller algorithm uses the redundant operation modes to control the DC/AC power inverter stages in a way that the resulting current difference is reduced. This is of course only possible for the +½ and the −½ level.

Figure 8:
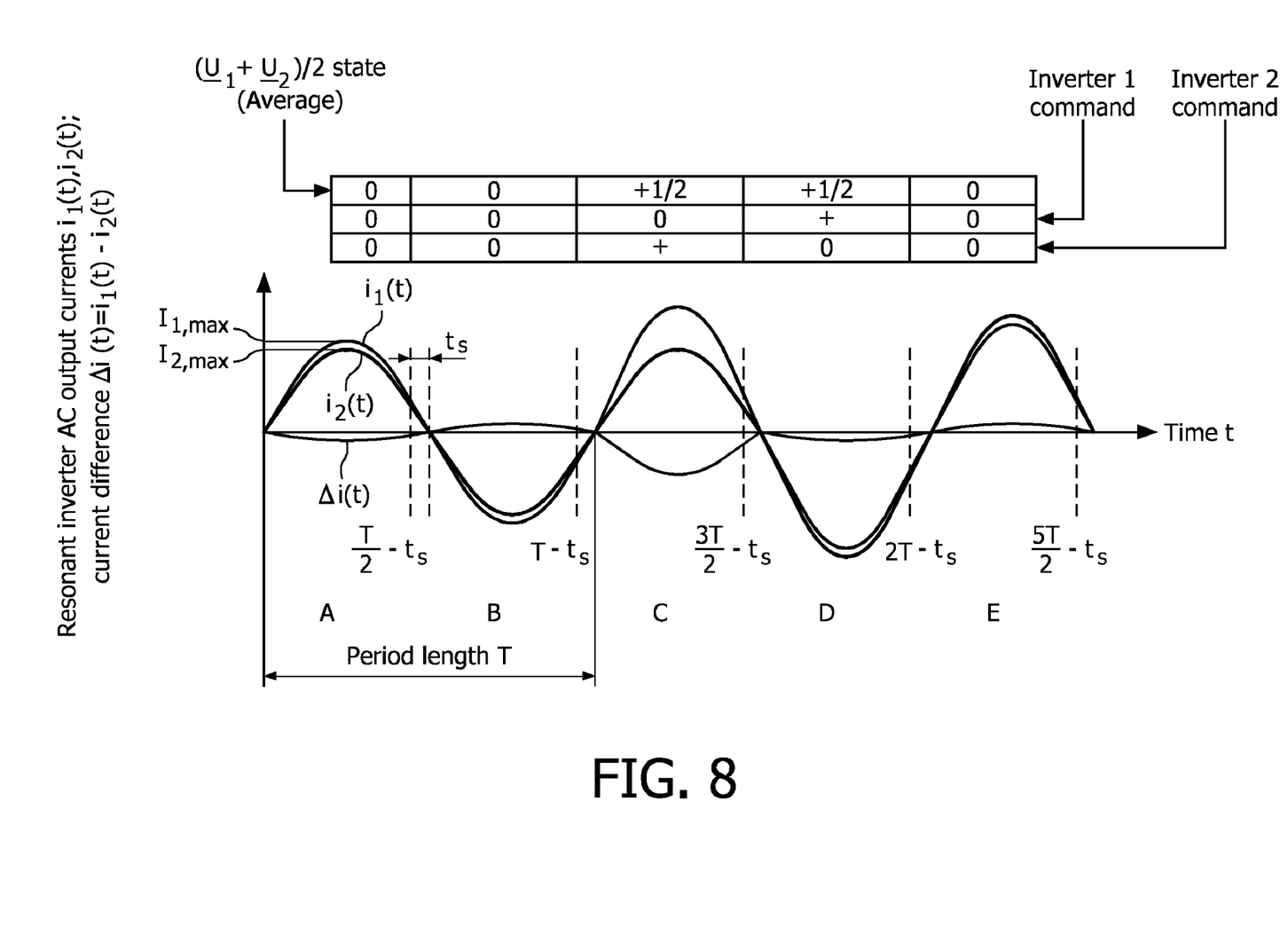
FIG. 8 shows two sinusoidal current waveforms for the resonant inverter output currents, which result from applying a certain one from a set of predefined operating modes, as well as the waveform for the difference of said inverter output currents.

FIG. 8 shows two sinusoidal waveforms $i_1(t)$ and $i_2(t)$ for inverter output currents $I_1$ and $I_2$, respectively, which result from applying given operating modes, preset by the output voltage $U_1$ of first DC/AC power inverter stage 402a, the output voltage $U_2$ of second DC/AC power inverter stage 402b and the output voltage $U_{out}'=f_2'(U_1, U_2)$ of claimed resonant DC/DC power converter circuit 400 as shown at the top of this figure. At sampling time instances $t=kT/2-t_s$ (with $t_s \ne kT/2$ and $k \in$), it can be shown that the obtained difference $\Delta i(t)$ between inverter currents $i_1(t)$ and $i_2(t)$ (here given by their time-domain notation) is greater or lower than zero. If the controller demands a non-redundant operation mode, such as e.g. given by the "+1" mode when both DC/AC power inverters are switched to the "+" mode, then the control algorithm cannot influence the current symmetry. If the controller demands a redundant state (e.g. +½), the control algorithm checks the different currents to choose an advantageous combination of the inverter operating modes to minimize the aforementioned different current as much as possible. Remaining differences are then compensated by the interphase transformer. It is a special advantage that such an interphase transformer also balances spreads in other components and inequalities between the inverter modules.

In this connection, it should be mentioned that the present invention is not limited to DC/DC power converter circuits with only two DC/AC power inverter stages that are to be symmetrized by being inductively coupled by a first and a second winding of an interphase transformer which is designed to balance differences in the output currents of the two inverter stages. It may advantageously be foreseen to symmetrize more than two DC/AC power inverter stages by providing an adequate number of interphase transformers for inductively coupling the outputs of each pair of these inverter stages. For a given number of N DC/AC power inverter stages, it can be shown that at least (N−1) interphase transformers have to be used to accomplish this task.

Figure 9:
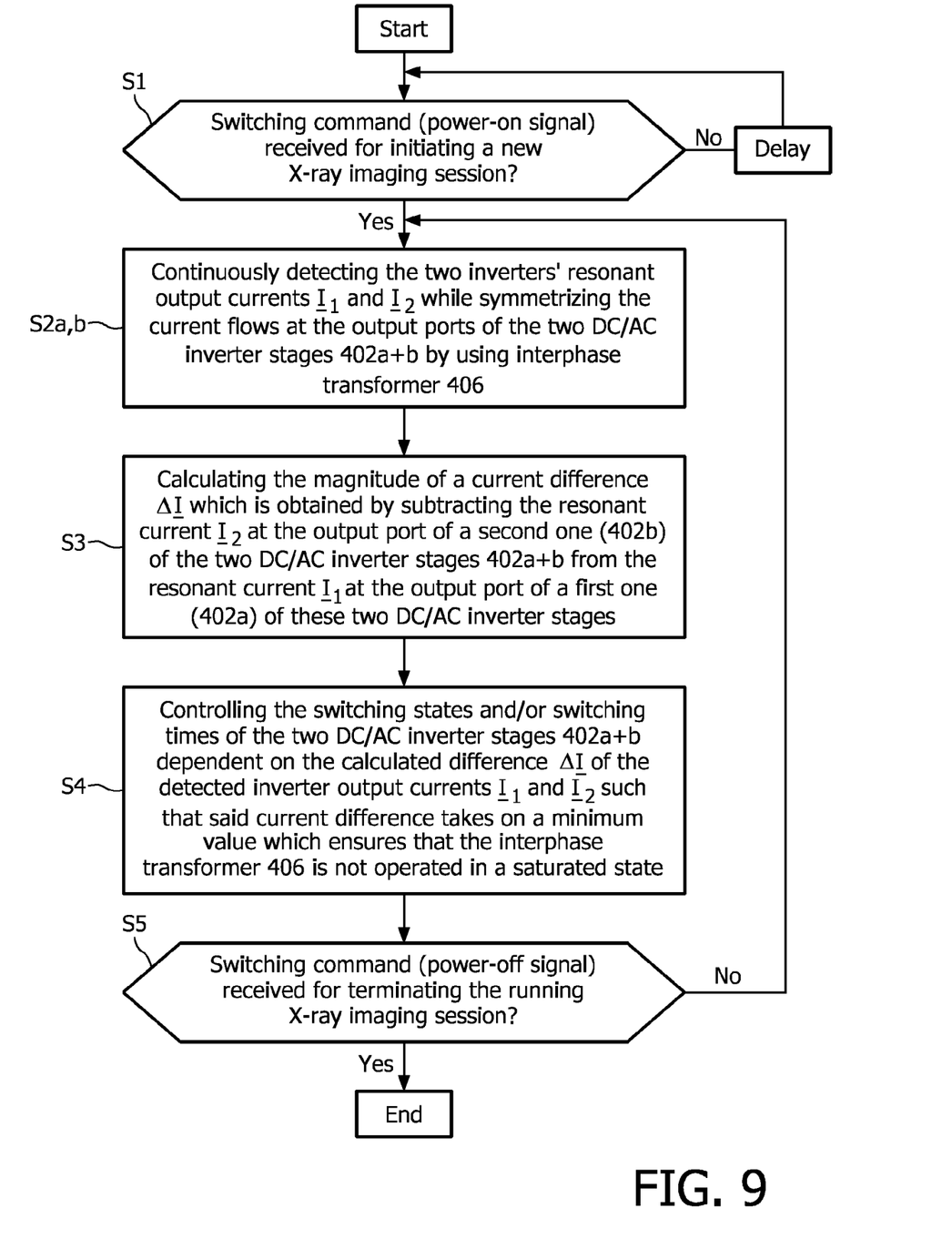
FIG. 9 shows a flow chart for illustrating the method for controlling a resonant DC/DC power converter circuit for supplying an output power for use in a high-voltage generator circuitry of an X-ray radiographic imaging system, 3D rotational angiography device or X-ray computed tomography device of the fan- or cone-beam type as claimed in the present invention.

A flow chart for illustrating the method for controlling a resonant DC/DC power converter circuit for supplying an output power for use in a high-voltage generator circuitry of an X-ray radiographic imaging system, 3D rotational angiography device or X-ray computed tomography device of the fan- or cone-beam type as claimed in the present invention is shown in FIG. 9. After having received (S1) a switching command (power-on signal) for initiating a new X-ray imaging session, the two inverters' resonant AC output currents $I_1$ and $I_2$ are continuously detected (S2b) while symmetrizing (S2a) the current flows at the output ports of the two DC/AC inverter stages 402a+b by using interphase transformer 406. Otherwise, the procedure is continued in a loop with step S1 after a predefined delay time $\Delta t$ until such a switching command has been received. In this case, the magnitude of a current difference $\Delta I$ which is obtained by subtracting the resonant current $I_2$ at the output port of a second one (402b) of the two DC/AC inverter stages 402a+b from the resonant current $I_1$ at the output port of a first one (402a) of these two DC/AC inverter stages is calculated (S3), and thereupon, which means dependent on the calculated difference $\Delta I$ of the detected inverter output currents $I_1$ and $I_2$, the switching states and/or switching times of the two DC/AC inverter stages 402a+b are controlled (S4) in such a way that said current difference takes on a minimum value which ensures that the interphase transformer 406 is not operated in a saturated state.

When receiving (S5) a switching command (power-off signal) for terminating the running X-ray imaging session, the procedure terminates. Otherwise, it is continued with steps S2a and S2b.

APPLICATIONS OF THE INVENTION

An immediate application of the claimed DC/DC power converter circuit consists in proceeding the development of high-voltage generators, especially voltage generators with very high power density that may advantageously be used as a voltage supply for next generation X-ray tubes. Aside therefrom, the invention may also be usefully applied for proceeding the development of DC/DC power converter circuit technology in general.

In this context, it should be noted that the required hardware and software effort for implementing this idea is low. Furthermore, it is to be mentioned that the proposed DC/DC power converter circuit does not cause any additional switching losses. Applying both interphase transformer and control algorithm ensures a well-symmetrized operation of the DC/AC full-bridge power inverter stages.

While the present invention has been illustrated and described in detail in the drawings and in the foregoing description, such illustration and description are to be considered illustrative or exemplary and not restrictive, which means that the invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage. A computer program may be stored/distributed on a suitable medium, such as e.g. an optical storage medium or a solid-state medium supplied together with or as part of other hardware, but may also be distributed in other forms, such as e.g. via the Internet or other wired or wireless telecommunication systems. Furthermore, any reference signs in the claims should not be construed as limiting the scope of the invention.

The invention claimed is:

1. A DC/AC power inverter control unit of a resonant power converter circuit, wherein said power converter circuit comprises two independent DC/AC power inverter stages for supplying a multi-primary winding transformer and wherein said DC/AC power inverter stages are inductively coupled by a first and a second winding of an interphase transformer which is designed to balance differences in output currents ($I_1$, $I_2$) of the two DC/AC power inverter stages.

2. The DC/AC power inverter control unit according to claim 1,
    wherein said resonant power converter circuit is a DC/DC converter for use in a high-voltage generator circuitry.

3. The DC/AC power inverter control unit according to claim 2,
    wherein said multi-primary winding transformer is designed for high-voltage operation.

4. The DC/AC power inverter control unit according to claim 3,
    wherein said high-voltage generator circuitry serves for supplying an output power for an X-ray radiographic imaging system, 3D rotational angiography device or X-ray computed tomography device of the fan- or cone-beam type.

5. The DC/AC power inverter control unit according to claim 1,
wherein said DC/AC power inverter control unit is adapted to minimize a magnitude of the inverter output currents' difference value (ΔI) to a value which ensures that the interphase transformer is not operated in a saturated state by controlling switching states and/or switching times of the DC/AC power inverter stages dependent on this current difference (ΔI), thus enabling zero current operation.

6. The DC/AC power inverter control unit according to claim 5,
wherein the first winding of the interphase transformer is connected in series to at least one resonant tank circuit serially connected to a first primary winding of the multi-winding transformer at an output port of a first one of said DC/AC power inverter stages and wherein the second winding of the interphase transformer is connected in series to at least one further resonant tank circuit serially connected to a second primary winding of the multi-winding transformer.

7. A resonant power converter circuit comprising two independent DC/AC power inverter stages for supplying a mufti-primary winding transformer, wherein said DC/AC power inverter stages are inductively coupled by a first and a second winding of an interphase transformer which is designed to balance differences in output currents ($I_1$, $I_2$) of the two DC/AC power inverter stages.

8. The resonant power converter circuit according to claim 7,
wherein said resonant power converter circuit is a DC/DC converter for use in a high-voltage generator circuitry.

9. The resonant power converter circuit according to claim 8,
wherein said mufti-primary winding transformer is designed for high-voltage operation.

10. The resonant power converter circuit according to claim 9,
wherein said high-voltage generator circuitry serves for supplying an output power for an X-ray radiographic imaging system, 3D rotational angiography device or X-ray computed tomography device of the fan- or cone-beam type.

11. The resonant power converter circuit according to claim 7,
comprising a DC/AC power inverter control unit which is adapted to minimize a magnitude of the inverter output currents' difference value (ΔI) to a value which ensures that the interphase transformer is not operated in a saturated state by controlling switching states and/or switching times of the DC/AC power inverter stages dependent on this current difference (ΔI), thus enabling zero current operation.

12. The resonant power converter circuit according to claim 11,
wherein the first winding of the interphase transformer is connected in series to at least one resonant tank circuit serially connected to a first primary winding of the multi-winding transformer at an output port of a first one of said DC/AC power inverter stages and wherein the second winding of the interphase transformer is connected in series to at least one further resonant tank circuit serially connected to a second primary winding of the multi-winding transformer.

13. A device selected from a group consisting of an X-ray radiographic imaging system, a 3D rotational angiography device, and an X-ray computed tomography device, comprising a resonant power converter circuit for supplying an output power for use in a high-voltage generator circuitry which provides a supply voltage for operating an X-ray tube, wherein said resonant power converter circuit comprises two independent DC/AC power inverter stages for supplying a multi-primary winding transformer and wherein said DC/AC power inverter stages are inductively coupled by a first and a second winding of an interphase transformer which is designed to balance differences in output currents ($I_1$, $I_2$) of the two DC/AC power inverter stages.

14. The device according to claim 13, further comprising:
a DC/AC power inverter control unit which is adapted to minimize a magnitude of the inverter output currents difference value (ΔI) to a value which ensures that the interphase transformer is not operated in a saturated state by controlling switching states and/or switching times of the DC/AC power inverter stages dependent on this current difference (ΔI), thus enabling zero current operation.

15. The device according to claim 14,
wherein the first winding of the interphase transformer is connected in series to at least one resonant tank circuit serially connected to a first primary winding of the multi-winding transformer at an output port of a first one of said DC/AC power inverter stages and wherein the second winding of the interphase transformer is connected in series to at least one further resonant tank circuit serially connected to a second primary winding of the multi-winding transformer.

16. A method for controlling a resonant power converter circuit for supplying an output power for use in a high-voltage generator circuitry of an X-ray radiographic imaging system, 3D rotational angiography device or X-ray computed tomography device of the fan- or cone-beam type, said resonant power converter circuit comprising two independent DC/AC power inverter stages for supplying a multi-primary winding transformer and said DC/AC power inverter stages being inductively coupled by a first and a second winding of an interphase transformer for balancing differences in resonant output currents ($I_1$, $I_2$) of the two DC/AC power inverter stages, wherein said first winding is connected in series to a first primary winding of the mufti-winding transformer at an output port of a first one of said DC/AC power inverter stages and wherein said second winding is connected in series to a second primary winding of the multi-winding transformer,
said method comprising the steps of
continuously detecting the two inverters' resonant output currents ($I_1$, $I_2$) during an initiated X-ray imaging session while symmetrizing current flows at the output ports of the two DC/AC power inverter stages by using said interphase transformer,
calculating a magnitude of a current difference (ΔI) which is obtained by subtracting the resonant current ($I_2$) at an port of a second one of the two DC/AC power inverter stages from the resonant current ($I_1$) at the output port of the first one of these two DC/AC power inverter stages, and
controlling switching states and/or switching times of the two DC/AC power inverter stages dependent on the calculated difference (ΔI) of the detected inverter output currents ($I_1$, $I_2$) such that said current difference takes on a minimum value which ensures that the interphase transformer is not operated in a saturated state, thus enabling zero current operation.

17. A non-transitory computer program product for implementing a method of controlling a resonant power converter circuit supplying an output power for use in a high-voltage generator circuitry of an X-ray radiographic imaging system, 3D rotational angiography device or X-ray computed tomography device of the fan- or cone-beam type when running on an operational control unit of such a system or device,
wherein said resonant power converter circuit comprises two independent DC/AC power inverter stages for supplying a multi-primary winding transformer and said DC/AC power inverter stages being inductively coupled by a first and a second winding of an interphase transformer for balancing differences in resonant output currents ($I_1$, $I_2$) of the two DC/AC power inverter stages, wherein said first winding is connected in series to a first primary winding of the multi-winding transformer at an output port of a first one of said DC/AC power inverter stages and wherein said second winding is connected in series to a second primary winding of the muiti-winding transformer,
said computer program product executing the steps of
calculating a magnitude of a current difference ($\Delta I$) which is obtained by subtracting the resonant current ($I_2$) detected at an output port of a second one of the two DC/AC power inverter stages from the resonant current ($I_1$) detected at the output port of the first one of these two DC/AC power inverter stages, said currents being symmetrized by means of said interphase transformer, and
controlling switching states and/or switching times of the two DC/AC power inverter stages dependent on the calculated difference ($\Delta I$) of the detected inverter output currents ($I_1$, $I_2$) such that said current difference takes on a minimum value which ensures that the interphase transformer is not operated in a saturated state, thus enabling zero current operation.

* * * * *